United States Patent
Kurikuma et al.

(10) Patent No.: US 8,700,246 B2
(45) Date of Patent: Apr. 15, 2014

(54) ELECTRICALLY-OPERATED CONSTRUCTION MACHINE

(75) Inventors: Hajime Kurikuma, Koka (JP); Katsuyoshi Nasu, Konan (JP); Tatsuo Takishita, Koka (JP); Wataru Takagi, Koka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/703,675

(22) PCT Filed: Oct. 19, 2011

(86) PCT No.: PCT/JP2011/074066
§ 371 (c)(1),
(2), (4) Date: Dec. 12, 2012

(87) PCT Pub. No.: WO2012/053560
PCT Pub. Date: Apr. 26, 2012

(65) Prior Publication Data
US 2013/0197766 A1 Aug. 1, 2013

(30) Foreign Application Priority Data
Oct. 22, 2010 (JP) ................... 2010-237461

(51) Int. Cl.
*B60L 9/00* (2006.01)
(52) U.S. Cl.
USPC .............................. 701/22; 701/50
(58) Field of Classification Search
USPC ............. 701/22, 50; 320/104, 137; 180/65.29
See application file for complete search history.

(56) References Cited

U.S. PATENT DOCUMENTS

| | | | |
|---|---|---|---|
| 7,769,505 B2* | 8/2010 | Rask et al. | 701/22 |
| 8,463,472 B2* | 6/2013 | Watanabe | 701/22 |
| 2009/0261761 A1* | 10/2009 | Yoshioka | 318/139 |
| 2010/0121507 A1* | 5/2010 | Ishii et al. | 701/22 |
| 2013/0079968 A1* | 3/2013 | Crombez | 701/22 |
| 2013/0123064 A1* | 5/2013 | Gwozdek et al. | 477/7 |

FOREIGN PATENT DOCUMENTS

| | | | |
|---|---|---|---|
| JP | 2002-146844 A | | 5/2002 |
| JP | 2007-228715 A | | 9/2007 |
| JP | 2007-284874 A | | 11/2007 |
| JP | 2009197514 A | * | 9/2009 |
| WO | 2007/105462 A1 | | 9/2007 |

OTHER PUBLICATIONS

International Preliminary Report on Patentability received in International Application No. PCT/JP2011/074066 dated May 23, 2013.

* cited by examiner

*Primary Examiner* — John R Olszewski
*Assistant Examiner* — Daniel Johnson
(74) *Attorney, Agent, or Firm* — Mattingly & Malur, PC (57) ABSTRACT

An electrically-operated construction machine with a battery charging operation. A lock switch provides a closed contact when a lock lever in a cab is placed in an unlock position. A feed port is disposed outside the cab to accept a cable from a commercial power source. The feed port is provided with a charge start switch. A control device has a motor control function for driving an electric motor with electrical power of a main battery when a signal is input from the lock switch. A charge control function is for charging the main battery with electrical power of the commercial power source when dictated by the charge start switch. The lock switch is wire-connected so as not to output the signal to the control device even if the closed contact is provided by the lock switch when the control device exercises charge control.

10 Claims, 10 Drawing Sheets

ELECTRICALLY-OPERATED CONSTRUCTION MACHINE

TECHNICAL FIELD

The present invention relates to an electrically-operated construction machine that includes a battery as an electrical power source for an electric motor.

BACKGROUND ART

In general, a hydraulic excavator used as a construction machine includes a lower travel structure, an upper swing structure, and a multi-joint work machine. The upper swing structure is swingably mounted on the lower travel structure. The multi-joint work machine is elevatably mounted on the upper swing structure and provided with a boom, an arm, and a bucket. The hydraulic excavator also includes, for example, a hydraulic pump, a plurality of hydraulic actuators (or more specifically, a boom hydraulic cylinder, an arm hydraulic cylinder, a bucket hydraulic cylinder, etc.), and a plurality of directional control valves. The hydraulic actuators are driven by hydraulic fluid discharged from the hydraulic pump. The directional control valves control the flow of hydraulic fluid, which flows from the hydraulic pump to the hydraulic actuators, in accordance with operations performed by a plurality of operating devices.

An electrically-operated hydraulic excavator (refer, for instance, to Patent Documents 1 and 2) proposed in recent years includes an electric motor as a drive source in place of an engine because the electric motor is at an advantage in that it emits no exhaust gas and significantly reduces noise and vibration. The electrically-operated hydraulic excavator includes a swing electric motor or hydraulic motor and a travel electric motor or hydraulic motor in addition to the aforementioned boom hydraulic cylinder, arm hydraulic cylinder, and bucket hydraulic cylinder. Further, the electrically-operated hydraulic excavator includes, for example, a battery as an electrical power source for the electric motor included in the electrically-operated hydraulic excavator.

For instance, as described in Patent Document 1, the above-mentioned electrically-operated hydraulic excavator with a battery is configured so that a cable from a commercial power source (external power source) can be connected to a feed port provided on a lateral surface of the upper swing structure (namely, on the outside of a cab). Further, for instance, as described in Patent Document 2, a switch capable of dictating battery charge is equipped in the cab. A power supply system incorporated in the electrically-operated hydraulic excavator has a motor control function for driving the electric motor by controlling the electrical power supplied from the battery and a charge control function for converting AC power supplied from the commercial power source to DC power and charging the battery, and exercises battery charge control in accordance with the dictation of the switch.

PRIOR ART LITERATURE

Patent Documents

Patent Document 1: JP,A 2007-284874
Patent Document 2: JP,A 2007-228715

SUMMARY OF THE INVENTION

Problem to be Solved by the Invention

However, the above-described conventional technologies have the following problems.

In the above-described conventional technologies, for instance, when the electrically-operated hydraulic excavator is inactive, an operator outside the cab connects the cable from the external power source to the feed port in order to charge the battery of the excavator. The operator then gets into the cab and manipulates a key switch to start the power supply system. Subsequently, the operator manipulates a charge switch to exercise battery charge control. It means that the operator has to get out of the cab and then get into the cab. This results in decreased work efficiency.

An object of the present invention is to provide an electrically-operated construction machine that is capable of increasing the work efficiency in a battery charging operation.

Means for Solving the Problem (1) In accomplishing the above-mentioned object, according to one aspect of the present invention, there is provided an electrically-operated construction machine having an electric motor serving as a drive source for a hydraulic pump, the hydraulic pump supplying hydraulic fluid to a hydraulic actuator for driving a to-be-driven member, or an electric motor for driving the to-be-driven member, a battery serving as an electrical power source for the electric motor, a feed port disposed outside a cab to make a cable connection to an external power source, a lock lever disposed inside the cab to switch between an unlock position and a lock position, a lock switch that provides a closed contact when the lock lever is placed in the unlock position and an open contact when the lock lever is placed in the lock position, a control device having a motor control function and a charge control function, the motor control function for driving the electric motor with electrical power supplied from the battery when a signal is input from the lock switch and stopping the electric motor when the signal is not input from the lock switch, the charge control function for charging the battery with electrical power supplied from the external power source, a key switch disposed inside the cab and placed in a start position or in a stop position, and a first start circuit that starts the control device by supplying electrical power from the electrical power source to the control device when the key switch is placed in the start position. The electrically-operated construction machine includes a charge switch and a second start circuit. The charge switch is disposed on the feed port and capable of dictating start of the control device and exercise of charge control. The second start circuit supplies electrical power from the electrical power source to the control device to start the control device and exercises charge control when the key switch is in the stop position and the charge switch dictates start of the control device and exercise of charge control. When the control device is started by the second start circuit to exercise charge control, the electric motor is not driven even if the lock switch provides the closed contact.

In the present invention described above, when the electrically-operated hydraulic excavator is inactive, an operator outside the cab connects the cable from the external power source to the feed port in order to charge the battery of the excavator. Further, the operator manipulates the charge switch on the feed port to start the control device and exercise charge control. Therefore, the operator does not have to get into the cab to manipulate the key switch or other operating control in the cab to charge the battery. This results in increased work efficiency. Further, the present invention is configured so that the electric motor is not driven even when the lock lever in the cab is placed in the unlock position. This prevents the electric motor from being driven during the battery charging operation, thereby making it possible to reduce working hours and avoid a malfunction. This also eliminates the necessity of getting into the cab to confirm the position of the lock lever in the cab or place the lock lever in the lock position. As a result, the work efficiency can be enhanced.

(2) According to another aspect of the present invention, there is provided the electrically-operated construction machine as described in (1) above, wherein the lock switch is connected to the electrical power source through the first start circuit. Therefore, when the control device is started by the second start circuit to exercise charge control, the first start circuit is opened to prevent the lock switch from outputting the signal to the control device no matter whether the closed contact is provided by the lock switch. This inhibits the electric motor from being driven.

(3) According to another aspect of the present invention, there is provided the electrically-operated construction machine as described in (1) above, wherein, when started by the second start circuit to exercise charge control, the control device disables the signal input from the lock switch to inhibit the electric motor from being driven.

(4) According to another aspect of the present invention, there is provided the electrically-operated construction machine as described in (1), (2), or (3) above, wherein the feed port is provided with an openable and closable cover so that the charge switch operates depending on whether the cover is open or closed, wherein, when the cover is open, the charge switch dictates start of the control device and exercise of charge control, and when the cover is closed, the charge switch dictates stop of the control device.

Consequently, the operator does not have to operate the charge switch. This results in a further increase in the work efficiency.

(5) According to still another aspect of the present invention, there is provided the electrically-operated construction machine as described in (1), (2), (3), or (4) above, wherein the feed port is provided with an indicator lamp that indicates the status of charge control.

Effect of the Invention

The present invention makes it possible to increase the work efficiency in a battery charging operation.

MODE FOR CARRYING OUT THE INVENTION

A first embodiment of the present invention will now be described with reference to the accompanying drawing on the assumption that the present invention is applied to an electrically-operated hydraulic excavator.

Figure 1:
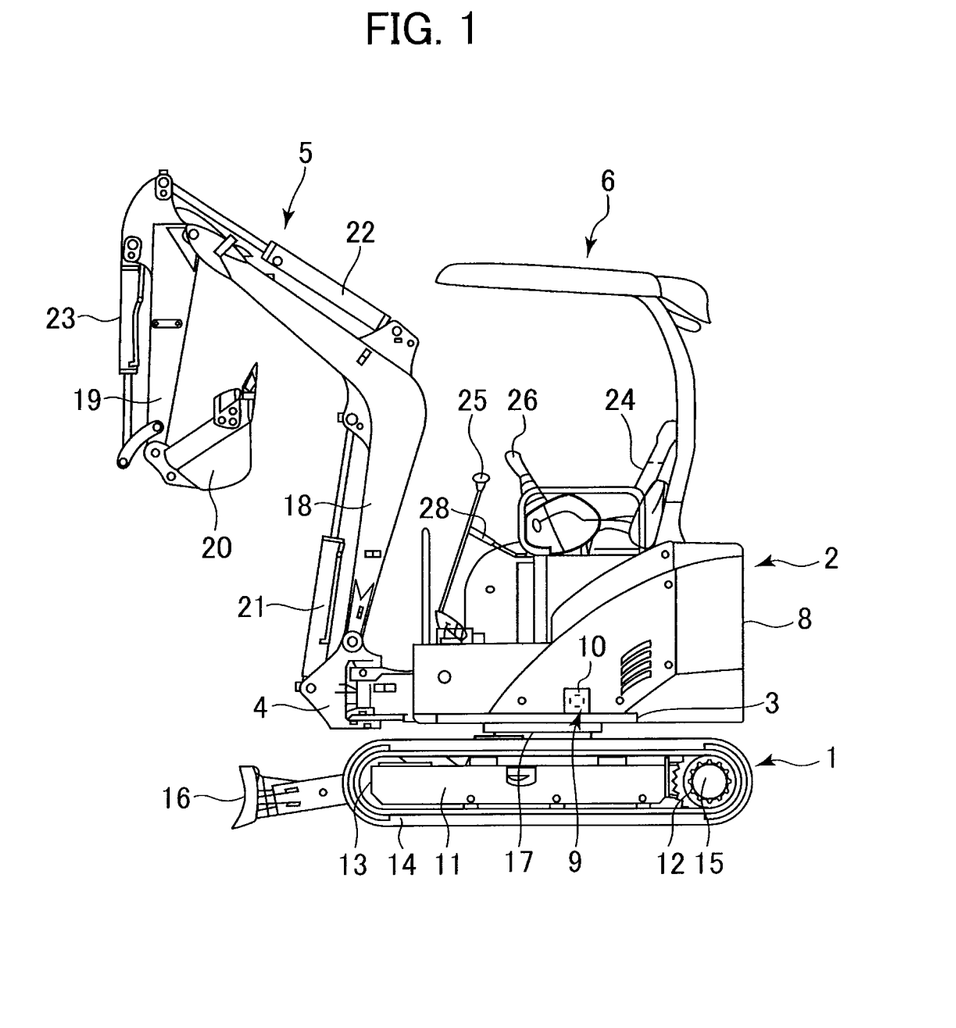
FIG. 1 is a side view illustrating the overall structure of an electrically-operated hydraulic excavator according to a first embodiment of the present invention.

FIG. 1 is a side view illustrating the overall structure of the electrically-operated hydraulic excavator according to the first embodiment. The front side (left side of FIG. 1), rear side (right side of FIG. 1), left side (front side of FIG. 1), and right side (rear side of FIG. 1) of an operator sitting on a cab seat of the electrically-operated hydraulic excavator shown in FIG. 1 will be hereinafter simply referred to as the front side, rear side, left side, and right side, respectively.

Figure 3:
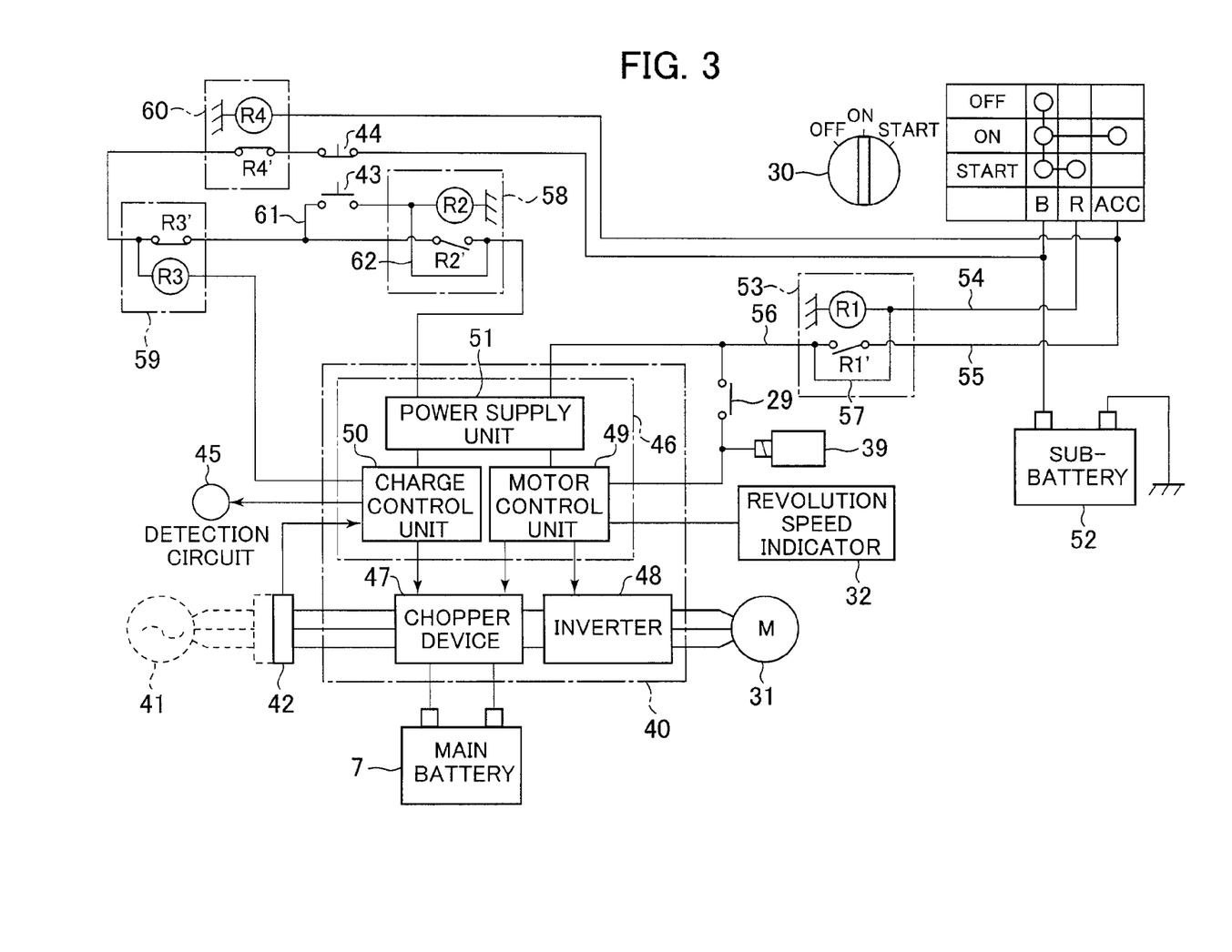
FIG. 3 is a schematic diagram illustrating the configuration of a power supply system according to the first embodiment of the present invention.

Referring to FIG. 1, the electrically-operated hydraulic excavator includes a crawler-type lower travel structure 1; an upper swing structure 2, which is swingably mounted on the lower travel structure 1; a swing frame 3, which forms a basic lower structure for the upper swing structure 2; a swing post 4, which is mounted on the front side of the swing frame 3 and can be turned in a left-right direction; a multi-joint work machine 5, which is coupled to the swing post 4 and can be turned (elevated) in an up-down direction; a canopy-type cab 6, which is mounted on the swing frame 4; and a battery compartment 8, which is disposed on the rear side of the swing frame 4 to house a main battery 7 (see later-referenced FIG. 3). Further, the left side of the upper swing structure 2 (that is, the outside of the cab 6) is provided with a feed port 9. A cover 10 is mounted on the feed port 9 and can be opened and closed.

The lower travel structure 1 includes a track frame 11, which is substantially shaped like the letter H when viewed from above; left- and right-side driving wheels 12, which are rotatably supported by portions close to the left- and right-side rear ends of the track frame 11; left- and right-side driven wheels (idlers) 13, which are rotatably supported by portions close to the left- and right-side front ends of the track frame 11; and left- and right-side crawlers 14, which are threaded around the left- and right-side driving wheels 12 and driven wheels 13. Left- and right-side travel hydraulic motors 15 are driven to rotate the left- and right-side driving wheels 12 (namely, the left- and right-side crawlers 14). This causes the lower travel structure 1 to travel.

A blade 16 for earth removal is mounted on the front side of the track frame 11 and can be moved up and down. A blade hydraulic cylinder (not shown) is telescopically driven to move the blade 16 up and down.

A swing wheel 17 is disposed at the center of the track frame 11 to permit the swing frame 3 to swing. A swing hydraulic motor (not shown) is driven to swing the swing frame 3 (namely, the upper swing structure 2).

The swing post 4 is mounted on the front side of the swing frame 3 and can be turned in a left-right direction. A swing hydraulic cylinder (not shown) is telescopically driven to turns the swing post 4 in the left-right direction when. This causes the work machine 5 to swing.

The work machine 5 includes a boom 18, which is coupled to the swing post 4 and can be turned in an up-down direction; an arm 19, which is coupled to the boom 18 and can be turned in an up-down direction; and a bucket 20, which is coupled to the arm 19 and can be turned in an up-down direction. The boom 18, the arm 19, and the bucket 20 are turned in the up-down direction by a boom hydraulic cylinder 21, an arm hydraulic cylinder 22, and a bucket hydraulic cylinder 23, respectively. The bucket 20 can be replaced, for instance, by an attachment (not shown) in which an optional hydraulic actuator is incorporated.

The cab 6 includes a cab seat (seat) 24 on which the operator sits. Left- and right-side travel control levers 25, which can be operated by a hand or by a foot, are disposed in the front of the cab seat 24. When manipulated in a front-rear direction, the travel control levers 25 dictate the operations of the left- and right-side travel hydraulic motors 15. An optional control pedal (not shown) is disposed at a left-side base of the left-side travel control lever 25. When manipulated in a left-right direction, the optional control pedal dictates the operation of the optional hydraulic actuator. A swing control pedal (not shown) is disposed at a right-side base of the right-side travel control lever 25. When manipulated in a left-right direction, the swing control pedal dictates the operation of the swing hydraulic cylinder.

An arm/swing control lever 26, which is a cross-directional control lever, is disposed on the left side of the cab seat 24. The arm/swing control lever 26 dictates the operation of the arm hydraulic cylinder 22 when manipulated in a front-rear direction and dictates the operation of the swing hydraulic motor when manipulated in a left-right direction. A boom/bucket control lever 27 (see later-referenced FIG. 2), which is a cross-directional control lever, is disposed on the right side of the cab seat 24. The boom/bucket control lever 27 dictates the operation of the boom hydraulic cylinder 21 when manipulated in a front-rear direction and dictates the operation of the bucket hydraulic cylinder 23 when manipulated in a left-right direction. A blade control lever (not shown) is disposed on the right side of the cab seat 24. The blade control lever dictates the operation of the blade hydraulic cylinder when manipulated in a front-rear direction.

A lock lever 28 is disposed on the left side of the cab seat 24 (namely, on a platform of the cab 6). The lock lever 28 is placed in either an unlock position (or more specifically, a descent position for inhibiting the operator from getting into and out of the cab 6) or a lock position (or more specifically, an ascent position for permitting the operator to get into and out of the cab 6). Further, a lock switch 29 (see later-referenced FIG. 3) is provided. The lock switch 29 provides an open contact when the lock lever 28 is placed in the unlock position and provides a closed contact when the lock lever 28 is placed in the lock position.

A later-described key switch 30 (see FIG. 3) and a revolution speed indicator 32 (see FIG. 3), which indicates a target revolution speed of a later-described electric motor 31 (see FIGS. 2 and 3), are disposed on the right side of the cab seat 24.

Figure 2:
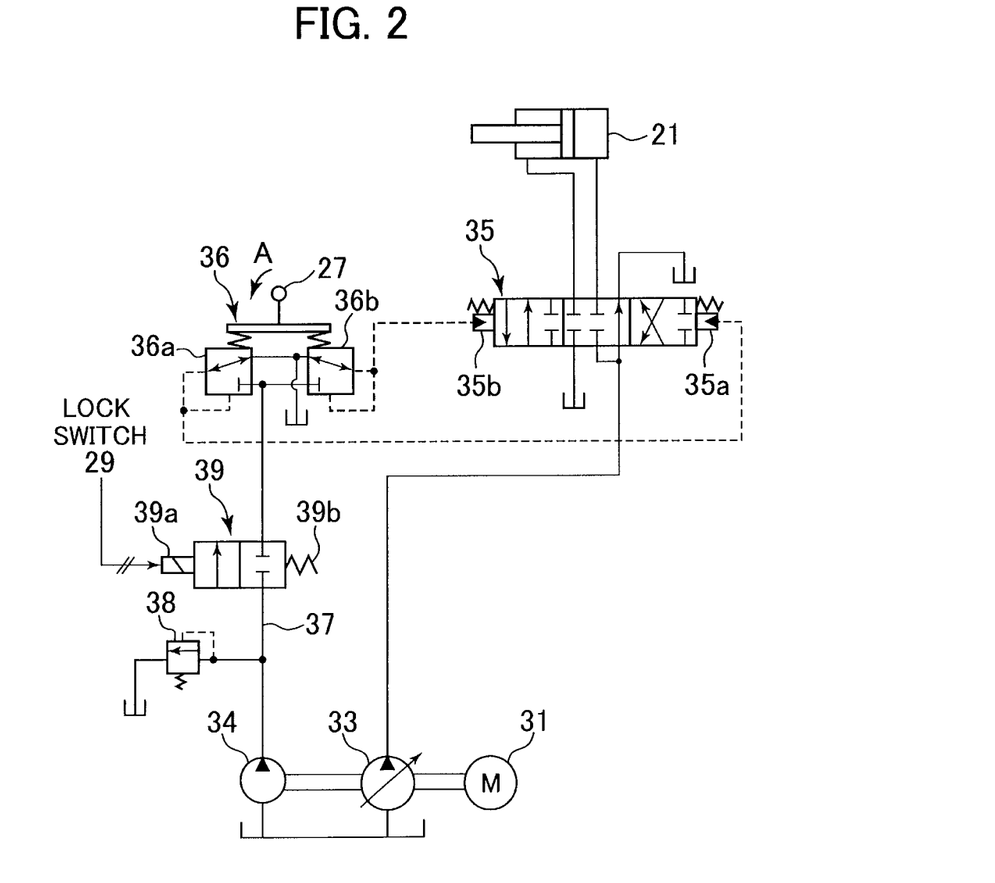
FIG. 2 is a schematic diagram illustrating a representative example that shows the configuration of a boom driving scheme in a hydraulic drive device according to the first embodiment of the present invention.

The aforementioned lower travel structure 1, upper swing structure 2, swing post 4, blade 16, boom 18, arm 19, and bucket 20 are driven by a hydraulic drive device mounted on the electrically-operated hydraulic excavator. FIG. 2 is a schematic diagram illustrating a representative example that shows the configuration of a scheme for driving the boom 18, which is in the hydraulic drive device.

Referring to FIG. 2, the hydraulic drive device includes the electric motor 31, a hydraulic pump 33, a pilot pump 34, a boom directional control valve 35, and an operating device 36. The hydraulic pump 33 and the pilot pump 34 are driven by the electric motor 31. The boom directional control valve 35 controls the flow of hydraulic fluid from the hydraulic pump 33 to the boom hydraulic cylinder 21.

The operating device 36 includes, for example, the aforementioned boom/bucket control lever 27, a pilot valve 36a, and a pilot valve 36b. The pilot valve 36a generates a pilot pressure by reducing the discharge pressure of the pilot pump 34 in accordance with an amount by which the boom/bucket control lever 27 is moved forward from its neutral position. The pilot valve 36b generates a pilot pressure by reducing the discharge pressure of the pilot pump 34 in accordance with an amount by which the boom/bucket control lever 27 is moved rearward from its neutral position.

When the boom/bucket control lever 27 is moved forward, the pilot pressure, which is generated by the pilot valve 36a in accordance with the amount by which the boom/bucket control lever 27 is moved forward from its neutral position, is output to a pressure-receiving portion 35a of the boom directional control valve 35. This causes the boom direction control valve 35 to switch into a right-side position shown in the figure. As a result, the boom hydraulic cylinder 21 contracts. On the other hand, when the boom/bucket control lever 27 is moved rearward, the pilot pressure, which is generated by the pilot valve 36b in accordance with the amount by which the boom/bucket control lever 27 is moved rearward from its neutral position, is output to a pressure-receiving portion 35b of the boom directional control valve 35. This causes the boom direction control valve 35 to switch into a left-side position shown in the figure. As a result, the boom hydraulic cylinder 21 expands.

A pilot relief valve 38 is connected to a discharge hydraulic line 37 of the pilot pump 34 to define the maximum discharge pressure of the pilot pump 34. A lock valve 39 is disposed in the discharge hydraulic line 37 of the pilot pump 34. The position in which the lock valve 39 is placed can be changed in accordance, for instance, with the manipulation of the aforementioned lock lever 28. More specifically, when the lock lever 28 is placed in the unlock position (descent position) to let the lock switch 29 provide the closed contact for energizing a solenoid portion 39a of the lock valve 39 through the lock switch 29, the lock valve 39 switches into the left-side position shown in the figure. This places the discharge hydraulic line 37 of the pilot pump 34 in a communicative state so that the discharge pressure of the pilot pump 34 is introduced into the operating device. On the other hand, when the lock lever 28 is placed in the lock position (ascent position) to let the lock switch 29 provide the open contact for de-energizing the solenoid portion 39a of the lock valve 39, the lock valve 39 switches into the right-side position shown in the figure due to the biasing force of a spring 39b. This places the discharge hydraulic line 37 of the pilot pump 34 in a blocked state. As a result, the pilot pressure is not generated even when the operating device is operated. Hence, the hydraulic actuator becomes inoperative.

Figure 4:
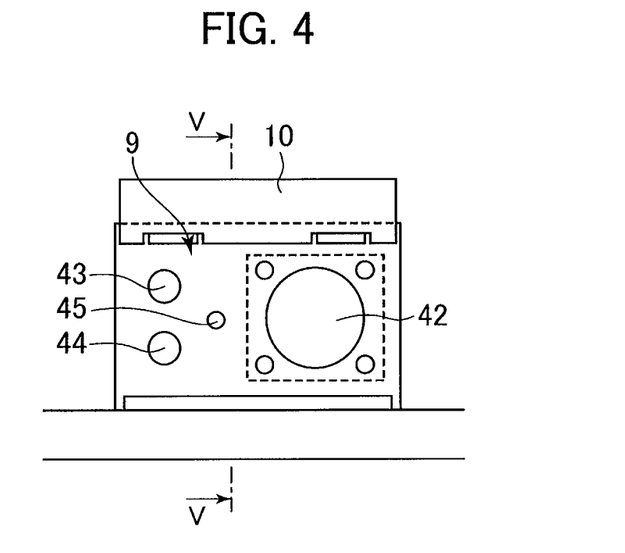
FIG. 4 is a partially enlarged side view illustrating the structure of a feed port according to the first embodiment of the present invention with a cover open.
Figure 5:
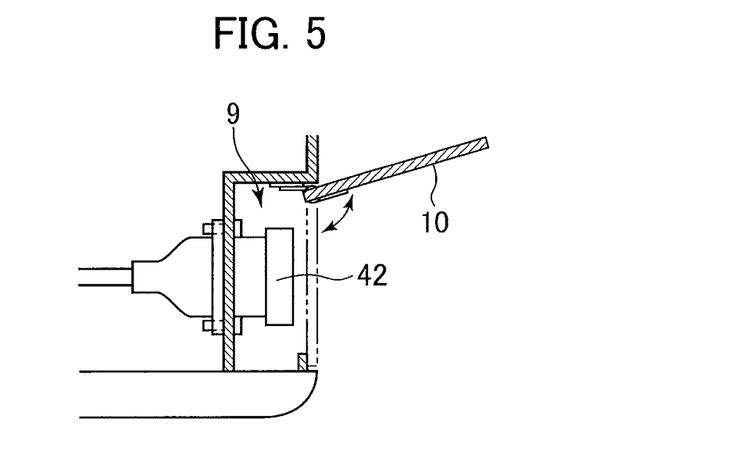
FIG. 5 is a cross-sectional view taken along line V-V of FIG. 4.

A power supply system incorporated in the electrically-operated hydraulic excavator, which is an essential part of the present embodiment, will now be described. FIG. 3 is a schematic diagram illustrating the configuration of the power supply system according to the present embodiment. A commercial power source (external power source) and its cable, which are indicated by broken lines in FIG. 3, are not incorporated in the electrically-operated hydraulic excavator. FIG. 4 is a partially enlarged side view illustrating the structure of the aforementioned feed port 9 shown in FIG. 1 (with the cover 10 open). FIG. 5 is a cross-sectional view taken along line V-V of FIG. 4.

Referring to FIGS. 3 to 5, the power supply system includes the main battery 7 and a control device 40. The main battery 7 is mounted in the battery compartment 8 disposed on the rear side of the upper swing structure 2 and is an electrical power source for the electric motor 31. More specifically, the main battery 7 has a plurality of battery cells and generates a total voltage of approximately 150 V. The control device 40 is disposed between the main battery 7 and the electric motor 31, and provided with a motor control function of driving the electric motor 31 by supplying electrical power from the main battery 7 to the electric motor 31.

The feed port 9, which is disposed on the left side of the upper swing structure 2, includes a feed socket 42, a charge start switch 43, a charge end switch 44, and indicator lamp (LED) 45. The feed socket 42 accepts a cable, for instance, from a 3-phase, 200-V commercial power source 41 (external power source). The control device 40 is disposed between the commercial power source 41 and the main battery 7 when the commercial power source 41 is connected to the feed port 9, and provided with a charge control function of charging the main battery 7 by supplying electrical power from the commercial power source 41 to the main battery 7.

The control device 40 includes a microcomputer 46, a chopper device 47, and an inverter 48. The microcomputer 46 includes, as functional elements, a motor control unit 49 for exercising drive control over the electric motor 31, a charge control unit 50 for exercising charge control over the main battery 7, and a power supply unit 51. The microcomputer 46 included in the control device 40 starts when a sub-battery 52 supplies electrical power to the power supply unit 51 through a first start circuit (detailed later) or a second start circuit (detailed later).

The first start circuit starts the microcomputer 46 in the control device 40 in accordance with an operation of the key switch 30 in the cab 6.

The key switch 30 includes a key cylinder and a key that can be inserted into the key cylinder. The key switch 30 can be rotated into an OFF position (stop position), an ON position, and a START position (start position) in the order named. When the key switch 30 is placed in the OFF position, a B terminal, an R terminal, and an ACC terminal do not become interconnected. When the key switch 30 is placed in the ON position, the B terminal and the ACC terminal become interconnected. When the key switch 30 is placed in the START position, the B terminal and the R terminal become interconnected. After being placed in the START position, the key switch 30 moves into the ON position due to the biasing force, for instance, of a spring.

The B terminal of the key switch 30 is connected to the sub-battery 52. The ACC and R terminals of the key switch 30 are connected to the control device 40 through a self-maintaining power supply relay 53. More specifically, the power supply relay 53 includes a coil R1 and a normally-open contact R1'. The coil R1 is connected to the R terminal of the key switch 30 through a wiring 54. One terminal of the contact R1' is connected to the ACC terminal of the key switch 30 through a wiring 55. The other terminal of the contact R1' is connected to the power supply unit 51 of the microcomputer 46 through a wiring 56. A wiring 57 is connected between the wiring 54 and the wiring 55.

When the key switch 30 is placed in the START position, electrical power is supplied from the sub-battery 52 to the power supply unit 51 of the microcomputer 46 through the B and R terminals of the key switch 30, the wiring 54, the wiring 57, and the wiring 56 to start the microcomputer 46. In this instance, the coil R1 of the power supply relay 53 is also energized to close the contact R1'. This ensures that electrical power from the sub-battery 52 is supplied to the power supply unit 51 of the microcomputer 46 through the B and ACC terminals of the key switch 30, the wiring 55, the contact R1' of the power supply relay 53, and the wiring 56 even when the key switch 30 subsequently moves to the ON position.

The solenoid portion 39a (see previously-referenced FIG. 2) of the lock valve 39 is connected to the wiring 56 through the lock switch 29. When the key switch 30 is placed in the START position (and when the key switch 30 is subsequently moved to the ON position) and the lock lever 28 is placed in the unlock position (descent position) to let the lock switch 29 provide a closed contact, a signal from the lock switch 29 is output not only to the solenoid portion 39a of the lock valve 39 but also to the motor control unit 49 of the microcomputer 46.

When the signal from the lock switch 29 is input, the motor control unit 49 of the microcomputer 46 drives the electric motor 31 by supplying electrical power from the main battery 7 to the electric motor 31. More specifically, the motor control unit 49 outputs a motor drive command signal to the chopper device 47. In compliance with the motor drive command signal, the chopper device 47 boosts a direct current received from the main battery 7, which has a voltage of approximately 150 V, to a voltage of approximately 270 V, and outputs the resulting current to the inverter 48. Further, the motor control unit 49 inputs a target revolution speed, which is set by the revolution speed indicator 32, and outputs a motor revolution speed command signal to the inverter 48 in accordance with the input target revolution speed. The inverter 48 converts the direct current received from the chopper device 47 to an alternating current in accordance with the motor revolution speed command signal and supplies the alternating current to the electric motor 31. The voltage applied to the electric motor 31 is then controlled to exercise control so that the revolution speed of the electric motor 31 agrees with the target revolution speed. When no signal is input from the lock switch 29, the motor control unit 49 of the microcomputer 46 stops the electric motor 31.

Even when the key switch 30 is in the OFF position, the second start circuit not only starts the microcomputer 46 in the control device 40 in accordance with an operation of the charge start switch 43, but also provides charge control over the main battery 7. The second start circuit includes the charge start switch 43, the charge end switch 44, a self-maintaining power supply relay 58, and circuit opening relays 59, 60. The charge start switch 43 is a momentary-action pushbutton switch and provided with a normally-open contact, which is closed while the switch 43 is depressed. The charge end switch 44 is a momentary-action pushbutton switch and provided with a normally-closed contact, which is open while the switch 44 is depressed. The power supply relay 58 has a coil R2 and a normally-open contact R2'. The circuit opening relay 59 has a coil R3 and a normally-closed contact R3'. The circuit opening relay 60 has a coil R4 and a normally-closed contact R4'.

The charge end switch 44, the contact R4' of the circuit opening relay 60, the contact R3' of the circuit opening relay 59, and the contact R2' of the power supply relay 58 are sequentially series-connected in an electrical path from the sub-battery 52 to the power supply unit 51 of the microcomputer 46. The charge start switch 43 is parallel-connected to the contact R2' of the power supply relay 58. More specifically, one terminal of the charge start switch 43 is connected between the contact R3' of the circuit opening relay 59 and the contact R2' of the power supply relay 58 through a wiring 61, and the other terminal of the charge start switch 43 is connected between the contact R2' of the power supply relay 58 and the power supply unit 51 of the microcomputer 46 through a wiring 62. The coil R2 of the power supply relay 58 is connected to the wiring 62.

While the charge start switch 43 is depressed to close its contact, the electrical power from the sub-battery 52 is supplied to the power supply unit 51 of the microcomputer 46 through the charge end switch 44, the contact R4' of the circuit opening relay 60, the contact R3' of the circuit opening relay 59, and the charge start switch 43 to start the microcomputer 46. In this instance, the coil R2 of the power supply relay 58 is also energized to close the contact R2'. This ensures that the coil R2 of the power supply relay 58 remains energized to close the contact R2' even when the charge start switch 43 is subsequently released (not depressed). Therefore, the electrical power from the sub-battery 52 is supplied to the power supply unit 51 of the microcomputer 46 through the charge end switch 44, the contact R4' of the circuit opening relay 60, the contact R3' of the circuit opening relay 59, and the contact R2' of the power supply relay 58.

Figure 6:
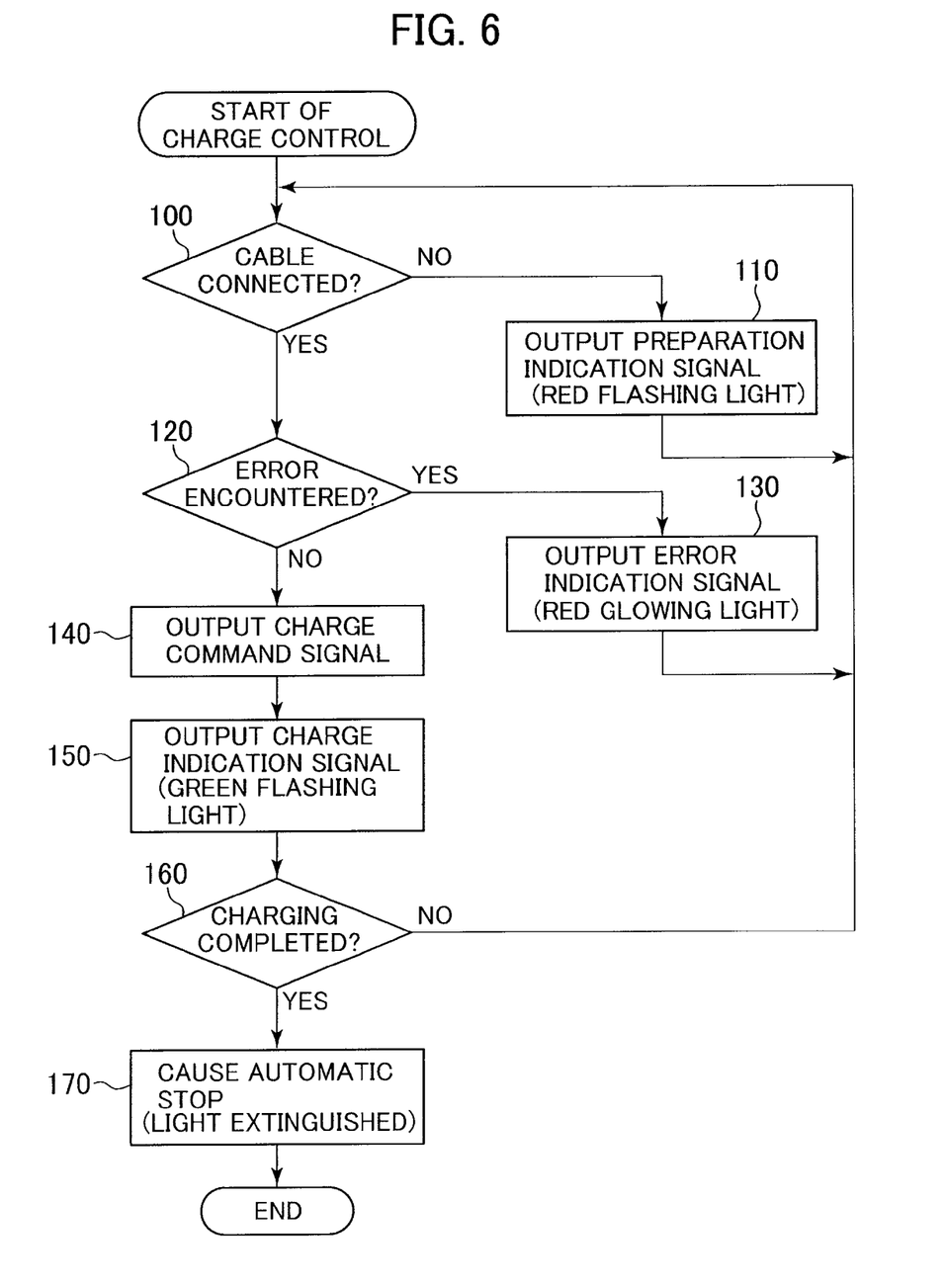
FIG. 6 is a flowchart illustrating how battery charge control is exercised by a control device according to the first embodiment of the present invention.

The charge control unit 50 in the microcomputer 46 judges whether electrical power is supplied from the aforementioned second start circuit. If it is found that electrical power is supplied from the second start circuit, the charge control unit 50 exercises charge control over the main battery 7. Processing steps performed for charging control will now be described with reference to FIG. 6. FIG. 6 is a flowchart illustrating the details of a charge control process.

Referring to FIG. 6, first of all, step 100 is performed to judge whether the cable of the commercial power source 41 is connected to the feed socket 42. More specifically, the feed socket 42 is provided with a detection circuit (not shown) that outputs a detection signal when the cable of the commercial power source 41 is connected to the feed socket 42. Step 100 is performed to judge whether the detection signal is output from the detection circuit. If the cable of the commercial power source 41 is not connected to the feed socket 42, the condition in step 100 is not met so that processing proceeds to step 110. In step 110, a preparation indication signal is output to the indicator lamp 45 on the feed port 9 so that the indicator lamp 45, for example, flashes red. On the other hand, if the cable of the commercial power source 41 is connected to the feed socket 42, the condition in step 110 is met so that processing proceeds to step 120.

Step 120 is performed to judge whether the main battery 7 is abnormal (in error). More specifically, a battery monitoring device (not shown) is provided to output an error signal if a monitored voltage or temperature of the main battery 7 is abnormal. Therefore, the judgment in step 120 is formulated depending on whether the error signal is output from the battery monitoring device. If the main battery 7 is found to be abnormal, the condition in step 120 is met so that processing proceeds to step 130. In step 130, an error indication signal is output to the indicator lamp 45 on the feed port 9 so that the indicator lamp 45, for example, glows red. On the other hand, if the main battery 7 is found to be normal, the condition in step 120 is not met so that processing proceeds to step 140.

In step 140, a charge command signal is output to the chopper device 47. In compliance with the charge command signal, the chopper device 47 converts an alternating current received from the commercial power source 41, which has a voltage of approximately 200 V, to a direct current, lowers the voltage of the direct current, and supplies the resulting direct current to the main battery 7 to charge the main battery 7. Next, in step 150, a charge indication signal is output to the indicator lamp 45 on the feed port 9 so that the indicator lamp 45, for example, flashes green.

Next, step 160 is performed to judge whether charging is completed. More specifically, the judgment in step 160 is formulated depending on whether a charge completion signal is received from the battery monitoring device. If, for example, the main battery 7 is not completely charged, processing returns to step 100 so as to repeat the same steps as described above. On the other hand, if, for example, the main battery 7 is completely charged, processing proceeds to step 170. In step 170, the coil R3 of the circuit opening relay 59 is energized to open the contact R3'. The power supply to the coil R2 of the power supply relay 58 is then shut off to open the contact R2'. As a result, the power supply from the sub-battery 52 to the power supply unit 51 of the microcomputer 46 is shut off to stop the microcomputer 46. This causes the indicator lamp 45 on the feed port 9 to go out.

For example, while the charge end switch 44 on the feed port 9 is depressed during battery charge control, the contact of the charge end switch 44 is open. The power supply to the coil R2 of the power supply relay 58 is then shut off to open the contact R2'. As a result, the power supply from the sub-battery 52 to the power supply unit 51 of the microcomputer 46 is shut off to stop the microcomputer 46. This causes the indicator lamp 45 on the feed port 9 to go out.

If, for example, the key switch 30 is placed in the ON position during battery charge control, the coil R4 of the circuit opening relay 60, which is wire-connected to the ACC terminal of the key switch 30, is energized to open the contact R4'. The power supply to the coil R2 of the power supply relay 58 is then shut off to open the contact R2'.

Operational advantages of the present embodiment, which is configured as described above, will now be described.

In the present embodiment, the feed port 9 includes the charge start switch 43, the charge end switch 44, and the indicator lamp 45. When the electrically-operated hydraulic excavator is inactive, the operator outside the cab 6 connects the cable from the commercial power source 41 to the feed port 9 in order to charge the battery of the excavator. Further, the operator manipulates the charge start switch 43 on the feed port 9 to start the control device 40 and exercise charge control over the main battery 7. Therefore, the operator does not have to get into the cab 6 to manipulate the key switch 30 or other operating control in the cab 6 to charge the battery. This results in increased work efficiency.

Further, in the present embodiment, the lock switch 29 is connected to the sub-battery 52 through the first start circuit (more specifically, the key switch 30 and the power supply relay 53). In other words, when the control device 40 is started by the second start circuit (more specifically, the charge start switch 43, the charge end switch 44, the self-maintaining power supply relay 58, and the circuit opening relays 59, 60) to exercise battery charge control, the first start circuit is open to let the lock switch 29 provide the closed contact even if the lock lever 28 is placed in the unlock position. Therefore, no signal is output from the lock switch 29 to the control device 40. This inhibits the electric motor 31 from being driven. Consequently, the electric motor 31 is not driven during the battery charging operation. This makes it possible to reduce working hours and avoid a malfunction. This also eliminates the necessity of getting into the cab 6 to confirm the position of the lock lever 28 in the cab 6 or place the lock lever 28 in the lock position. As a result, the work efficiency can be enhanced.

A second embodiment of the present invention will now be described with reference to FIG. 7.

Figure 7:
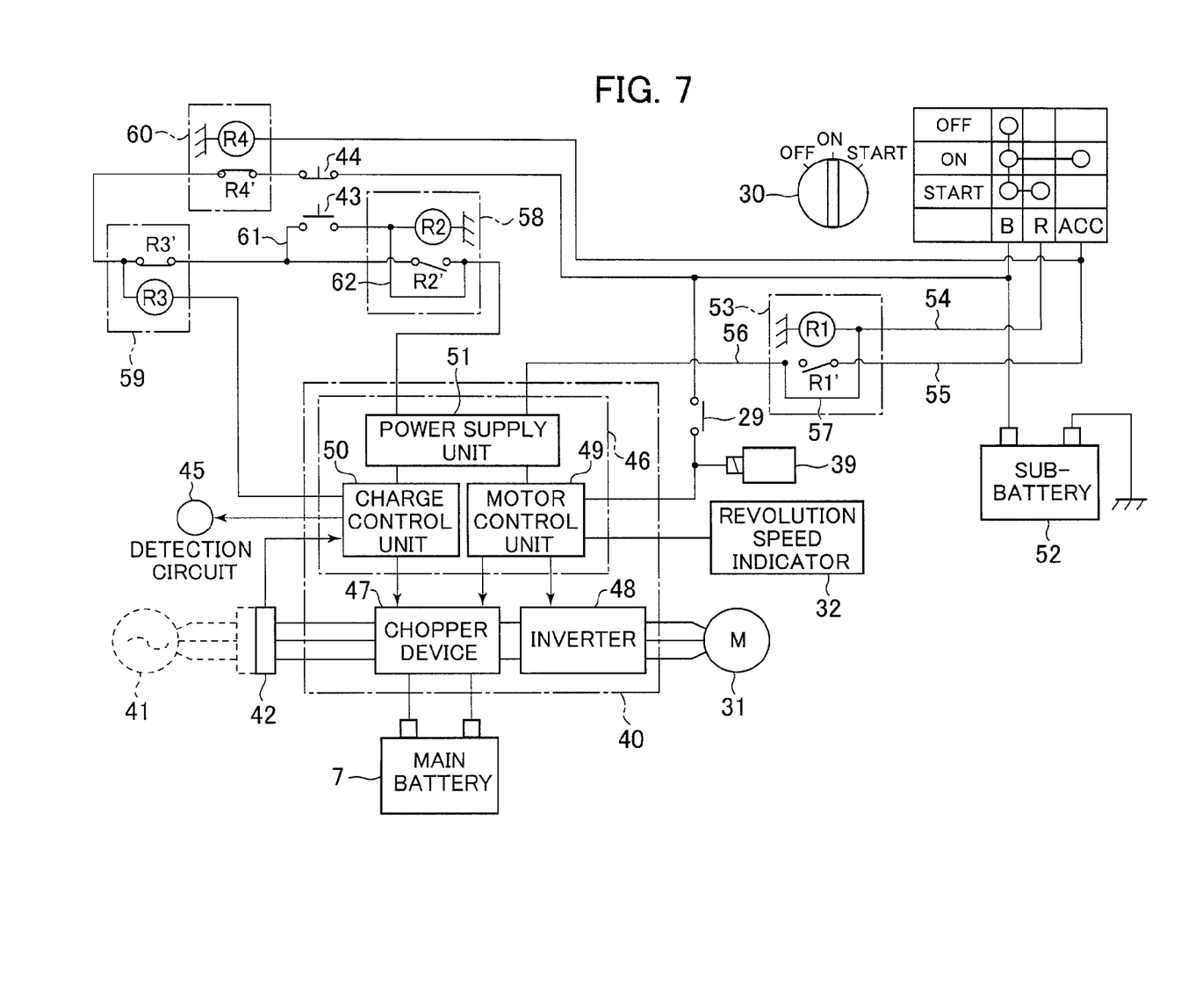
FIG. 7 is a schematic diagram illustrating the configuration of the power supply system according to a second embodiment of the present invention.

FIG. 7 is an electrical circuit diagram illustrating an electrical system for the electrically-operated hydraulic excavator according to the second embodiment. Referring to FIG. 7, the same elements as those described in connection with the first embodiment are designated by the same reference numerals as the corresponding elements and will not be redundantly described.

The second embodiment differs from the first embodiment in that the lock switch 29 is wire-connected to the sub-battery 52 without being connected to the first start circuit (more specifically, the key switch 30 and the power supply relay 53). Therefore, even when the microcomputer 46 in the control device 40 is started by the second start circuit (more specifically, the charge start switch 43, the charge end switch 44, the self-maintaining power supply relay 58, and the circuit opening relays 59, 60) to exercise charge control, the lock switch 29 outputs its signal as far as the lock lever 28 is placed in the unlock position (descent position) to let the lock switch 29 provide the closed contact.

Hence, the motor control unit 51 of the microcomputer 46 judges whether electrical power is supplied from the second start circuit. If the electrical power is found to be supplied from the second start circuit, the signal input from the lock switch 29 is disabled. In other words, the electric motor 31 is not driven no matter whether the signal is input from the lock switch 29.

The second embodiment, which is configured as described above, increases the work efficiency in the battery charging operation, as is the case with the first embodiment.

The first and second embodiments have been described on the assumption that the charge start switch (more specifically, a momentary-action pushbutton switch) and the charge end switch (more specifically, a momentary-action pushbutton switch) are disposed on the feed port 9. However, the present invention is not limited to the above-described embodiments. Various modifications can be made without departing from the spirit and scope of the present invention.

Figure 8:
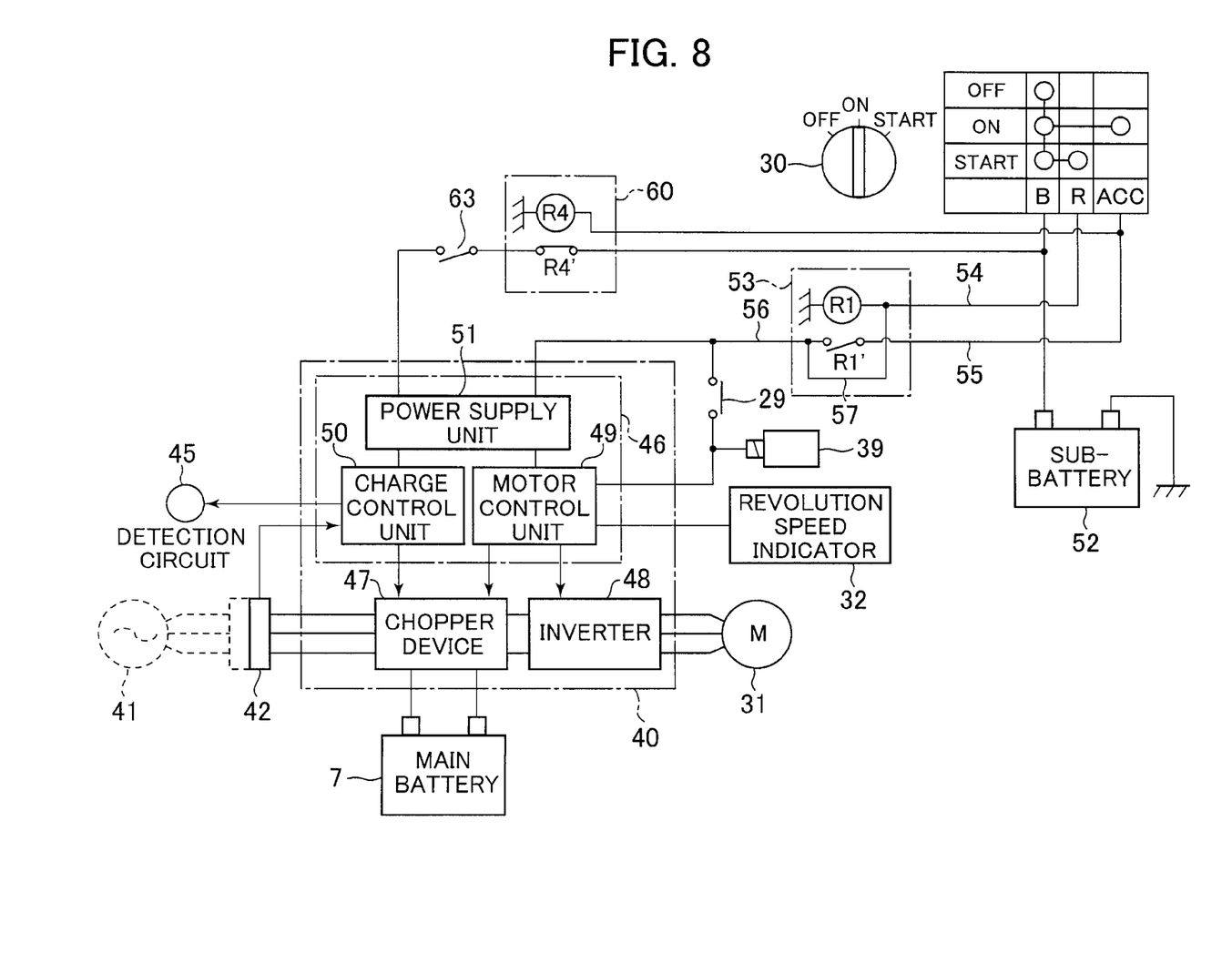
FIG. 8 is a schematic diagram illustrating the configuration of the power supply system according to a first modification of the present invention.
Figure 9:
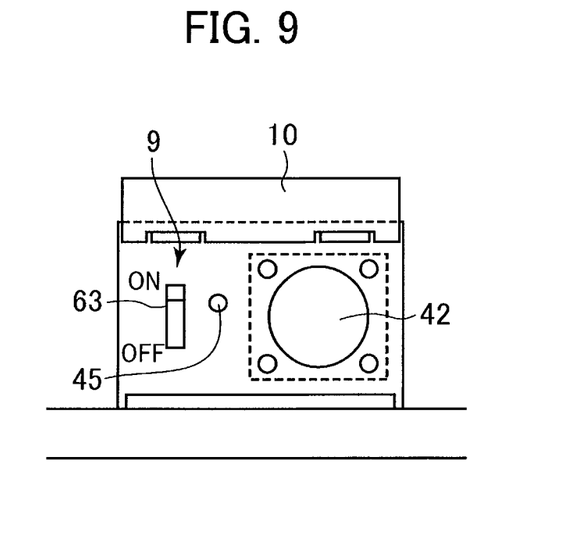
FIG. 9 is a partially enlarged side view illustrating the configuration of a feed port according to the first modification of the present invention with a cover open.
Figure 10:
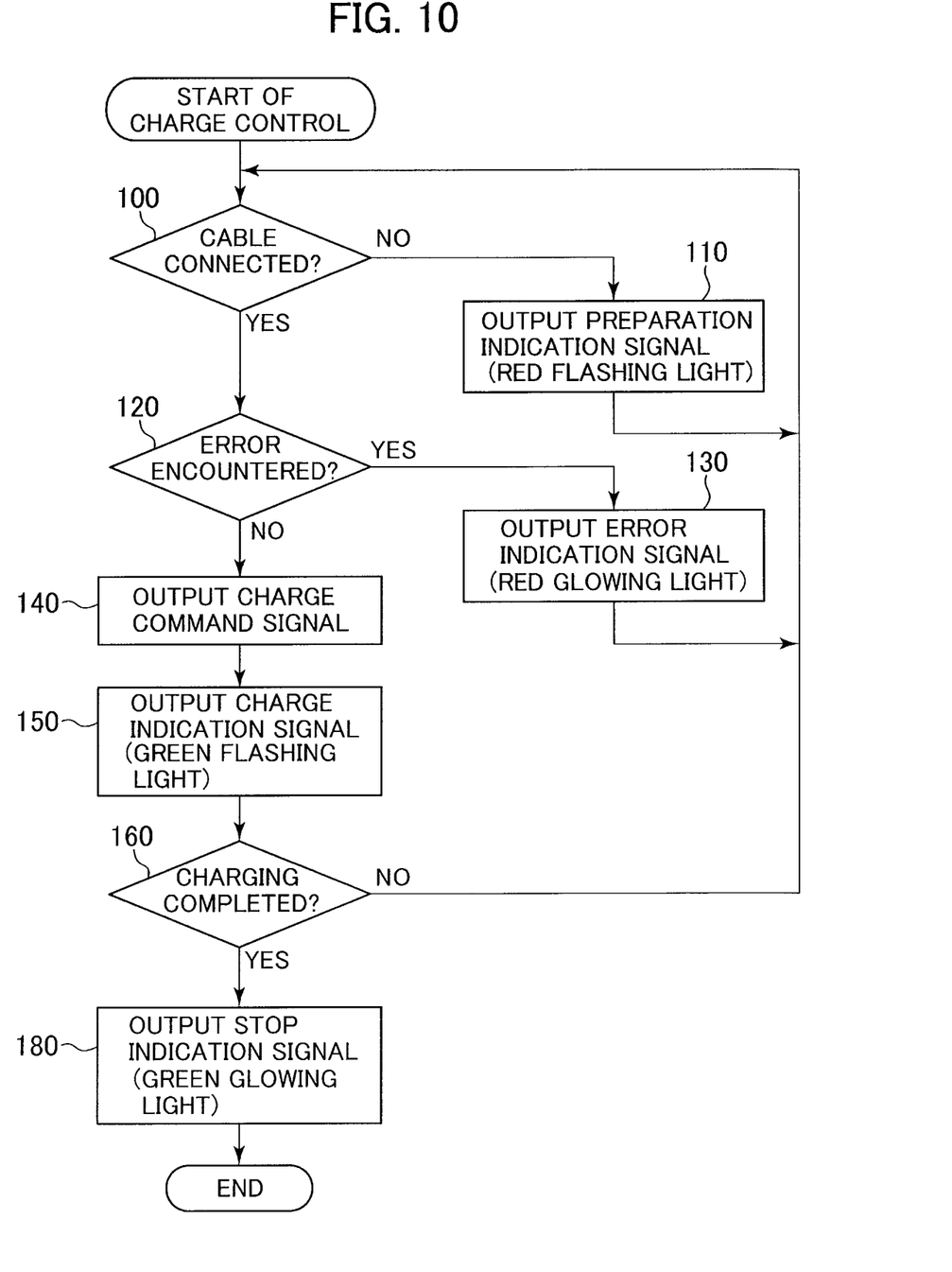
FIG. 10 is a flowchart illustrating how battery charge control is exercised by a control device according to the first modification of the present invention.

For instance, in a first modification illustrated in FIGS. 8 and 9, a feed port 9 is provided with a charge switch 63 that can be placed in either the ON position or the OFF position. The charge switch 63 and the circuit opening relay 60 form the second start circuit. More specifically, when placed in the ON position, the charge switch 63 dictates start of the microcomputer 46 in the control device 40 and exercise of charge control. On the other hand, when placed in the OFF position, the charge switch 63 dictates stop of the microcomputer 46 in the control device 40. As shown in FIG. 10, If, for instance, the judgment result obtained in step 160 indicates that the main battery 7 is completely charged, the charge control unit 50 in the microcomputer 46 proceeds to step 180 because the condition in step 160 is met, and outputs a stop indication signal to the indicator lamp 45 on the feed port 9, so that the indicator lamp 45, for example, glows green. The first modification, which is described above, also makes it possible to increase the work efficiency in the battery charging operation, as is the case with the foregoing embodiments.

Figure 11:
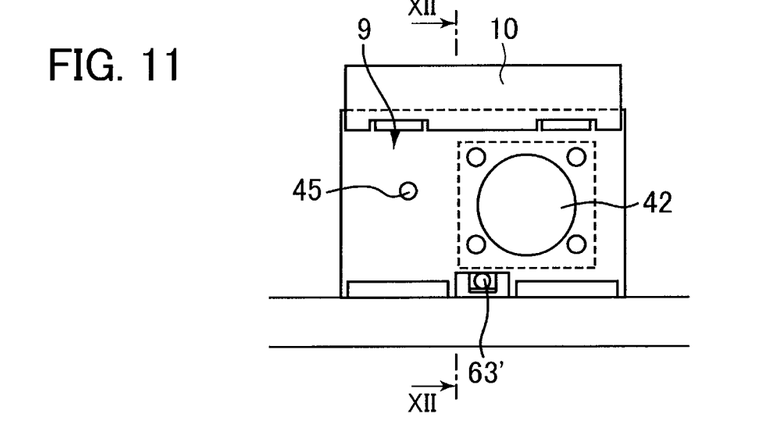
FIG. 11 is a partially enlarged side view illustrating the configuration of a feed port according to a second modification of the present invention with a cover open.
Figure 12:
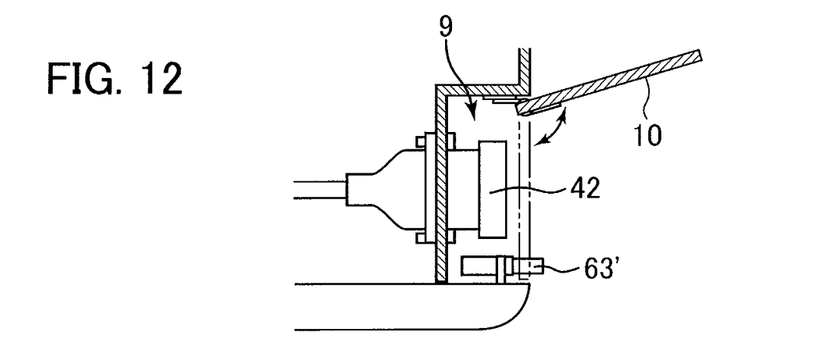
FIG. 12 is a cross-sectional view taken along line XII-XII of FIG. 11.

For instance, in a second modification illustrated in FIGS. 11 and 12, a charge switch 63' is employed. The charge switch 63' operates depending on whether the cover 10 is open or closed. More specifically, when the cover 10 is open, the charge switch 63' dictates start of the microcomputer 46 in the control device 40 and exercise of charge control. On the other hand, when the cover 10 is closed, the charge switch 63' dictates stop of the microcomputer 46 in the control device 40. The second modification, which is described above, saves the operator from having to manipulate the charge switch and makes it possible to further increase the work efficiency in the battery charging operation.

The first and second embodiments have been described on the assumption that the control device 40 has a control function (internal battery drive mode) for driving the electric motor 31 with electrical power supplied from the main battery 7 incorporated in the electrically-operated hydraulic excavator. However, the control device 40 may have not only the above control function but also a control function (external power source drive mode) for driving the electric motor with electrical power supplied from an external power source and selectively use either of these control functions. In this case, too, the above-described operational advantages can be obtained.

Figure 13:
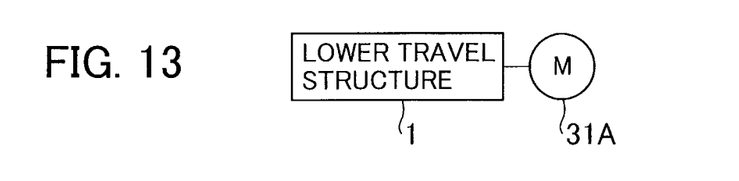
FIG. 13 is a schematic diagram illustrating a travel electric motor according to a third modification of the present invention.
Figure 14:
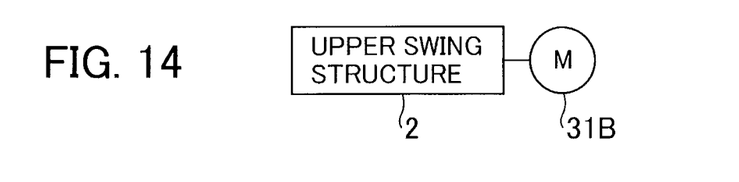
FIG. 14 is a schematic diagram illustrating a swing electric motor according to a fourth modification of the present invention.

The present invention has been described on the assumption that it is applied to an electrically-operated hydraulic excavator that includes, for example, the travel hydraulic motors 15, the boom hydraulic cylinder 21, the arm hydraulic cylinder 22, the bucket hydraulic cylinder 23, and the swing hydraulic motor as the hydraulic actuators and incorporates the electric motor 31 that drives the hydraulic pump 33 for supplying hydraulic fluid to the above-mentioned hydraulic actuators. However, the present invention is not limited to such an electrically-operated hydraulic excavator. For example, the present invention is also applicable to an electrically-operated hydraulic excavator that includes travel electric motors 31A (see FIG. 13) in place of the travel hydraulic motors 15 and drives the travel electric motors 31A to rotate the driving wheels 12 and cause the lower travel structure 1 to travel. Further, the present invention can also be applied to an electrically-operated hydraulic excavator that includes, for example, a swing electric motor 31B (see FIG. 14) in place of the swing hydraulic motor and drives the swing electric motor 31B to swing the upper swing structure 2. Moreover, it is obvious that the present invention is applicable not only to an electrically-operated hydraulic excavator but also to other electrically-operated construction machines such as an electrically-operated hydraulic crane.

DESCRIPTION OF REFERENCE NUMERALS

6 . . . Cab
7 . . . Main battery
9 . . . Feed port
10 . . . Cover
15 . . . Travel hydraulic motor
21 . . . Boom hydraulic cylinder
22 . . . Arm hydraulic cylinder
23 . . . Bucket hydraulic cylinder
28 . . . Lock lever
29 . . . Lock switch
30 . . . Key switch
31 . . . Electric motor
33 . . . Hydraulic pump
40 . . . Control device
41 . . . Commercial power source (external power source)
43 . . . Charge start switch (charge switch)

45 ... Indicator lamp
52 ... Sub-battery
53 ... Power supply relay
58 ... Power supply relay
59 ... Circuit opening relay
60 ... Circuit opening relay
63 ... Charge switch

The invention claimed is:

1. An electrically-operated construction machine having
an electric motor serving as a drive source for a hydraulic pump, the hydraulic pump supplying hydraulic fluid to a hydraulic actuator for driving a to-be-driven member, or an electric motor for driving the to-be-driven member,
a battery serving as an electrical power source for the electric motor,
a feed port disposed outside a cab to make a cable connection to an external power source,
a lock lever disposed inside the cab to switch between an unlock position and a lock position,
a lock switch that provides a closed contact when the lock lever is placed in the unlock position and an open contact when the lock lever is placed in the lock position,
a control device having a motor control function and a charge control function, the motor control function for driving the electric motor with electrical power supplied from the battery when a signal is input from the lock switch and stopping the electric motor when the signal is not input from the lock switch, the charge control function for charging the battery with electrical power supplied from the external power source,
a key switch disposed inside the cab and placed in a start position or in a stop position, and
a first start circuit that starts the control device by supplying electrical power from the electrical power source to the control device when the key switch is placed in the start position, the electrically-operated construction machine comprising:
a charge switch that is disposed on the feed port and capable of dictating start of the control device and exercise of charge control; and
a second start circuit that supplies electrical power from the electrical power source to the control device to start the control device and exercises charge control when the key switch is in the stop position and the charge switch dictates start of the control device and exercise of charge control;
wherein, when the control device is started by the second start circuit to exercise charge control, the electric motor is not driven even if the lock switch provides the closed contact.

2. The electrically-operated construction machine according to claim 1,
wherein the lock switch is connected to the electrical power source through the first start circuit so that when the control device is started by the second start circuit to exercise charge control, the first start circuit is opened to prevent the lock switch from outputting the signal to the control device no matter whether the closed contact is provided by the lock switch and inhibit the electric motor from being driven.

3. The electrically-operated construction machine according to claim 2,
wherein the feed port is provided with an openable and closable cover so that the charge switch operates depending on whether the cover is open or closed,
wherein, when the cover is open, the charge switch dictates start of the control device and exercise of charge control, and
when the cover is closed, the charge switch dictates stop of the control device.

4. The electrically-operated construction machine according to claim 2,
wherein the feed port is provided with an indicator lamp that indicates the status of charge control.

5. The electrically-operated construction machine according to claim 1,
wherein when started by the second start circuit to exercise charge control, the control device disables the signal input from the lock switch to inhibit the electric motor from being driven.

6. The electrically-operated construction machine according to claim 5,
wherein the feed port is provided with an openable and closable cover so that the charge switch operates depending on whether the cover is open or closed,
wherein, when the cover is open, the charge switch dictates start of the control device and exercise of charge control, and
when the cover is closed, the charge switch dictates stop of the control device.

7. The electrically-operated construction machine according to claim 5,
wherein the feed port is provided with an indicator lamp that indicates the status of charge control.

8. The electrically-operated construction machine according to claim 1,
wherein the feed port is provided with an openable and closable cover so that the charge switch operates depending on whether the cover is open or closed,
wherein, when the cover is open, the charge switch dictates start of the control device and exercise of charge control, and
when the cover is closed, the charge switch dictates stop of the control device.

9. The electrically-operated construction machine according to claim 8,
wherein the feed port is provided with an indicator lamp that indicates the status of charge control.

10. The electrically-operated construction machine according to claim 1,
wherein the feed port is provided with an indicator lamp that indicates the status of charge control.

* * * * *